Patented Feb. 12, 1924.

1,483,152

UNITED STATES PATENT OFFICE.

JEAN ALTWEGG, OF LYON, FRANCE, ASSIGNOR TO SOCIETE CHIMIQUE DES USINES DU RHONE, OF PARIS, FRANCE.

PROCESS FOR THE PRODUCTION OF SOLUTIONS OF VOLATILE OILS.

No Drawing. Application filed April 11, 1922. Serial No. 551,651.

*To all whom it may concern:*

Be it known that I, JEAN ALTWEGG, residing at Lyon, France, a citizen of the Confederation of Switzerland, have invented certain new and useful Improvements in Processes for the Production of Solutions of Volatile Oils, of which the following is a specification.

From very ancient times it has been known that volatile oils possess great preserving powers. From recent investigations it has become known that this well-known effect of preventing putrefaction is connected with the antiseptic properties of volatile oils. Quite recently Clavel has shown (see "Compts rendus de l'Academie des Sciences," Vol. 166, page 827, 1918) that this antiseptic power attains an extraordinarily high value in a long series of known volatile oils and far surpasses, for example, carbolic acid. Attempts have been made to utilize these properties of volatile oils in therapeutics as for example in the treatment of wounds. These attempts failed, however, owing to the slight solubility of volatile oils in water; and it was necessary to make shift with unsuitable alcoholic or acetone solutions or with inconvenient oil emulsions.

It has now been discovered that the volatile oils dissolve in alkali salt solutions of bile acids (gall acids). These solutions can be employed directly in the treatment of wounds and exhibit the surprising property of permitting dilution to a heavy extent with water. Thus permanent emulsions are formed particularly adapted for antiseptic washings and irrigation. All these solutions combine the properties of the bile salts of dissolving pus, mucus, and lipoid matter with the antiseptic effect of the volatile oils.

Example I: To a solution containing 300 grammes sodium salt of bile acids (natrium choleinicum) to the litre is gradually added with constant stirring 100 c. cm. of oil of thyme, thus obtaining a clear and somewhat oily solution. By diluting this solution with water to such an extent that there remains one gramme of oil of thyme to the litre, there will thus be produced a whitish thoroughly permanent emulsion which moistens the human skin after the manner of soap.

Example II: When in Example I oil of thyme is replaced by oil of cloves, wholly like solutions are obtained. The correspondingly diluted emulsions are more turbid but nevertheless, very stable.

What I claim and desire to secure by Letters Patent is:—

1. A process for the production of solutions of volatile oils, which consists in dissolving the volatile oils in alkali salt solutions of bile acids.

2. The process of producing a solution of a volatile oil, which consists in dissolving oil of thyme in an alkali salt solution of bile acid.

3. The process of producing a solution of volatile oil, which consists in forming a solution containing 300 grams of sodium salt of bile acids to the litre, and gradually adding thereto 100 c. cm. of oil of thyme while constantly stirring the solution.

In testimony whereof I have signed my name to this specification.

JEAN ALTWEGG.

Witnesses:
JULIAN GAMBLE SMEDLY,
CYRUS BROWN FOLLMER.